Figure 1:
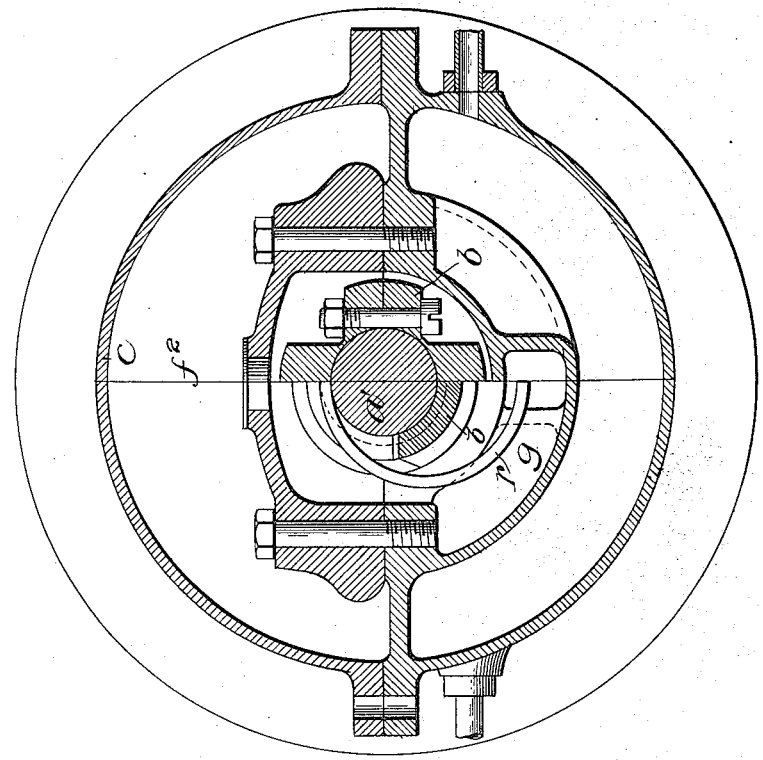

A. C. E. RATEAU.
SHAFT BEARING.
APPLICATION FILED DEC. 7, 1906.

1,125,172.

Patented Jan. 19, 1915
2 SHEETS—SHEET 1.

Witnesses:

Inventor:
Auguste C. E. Rateau,

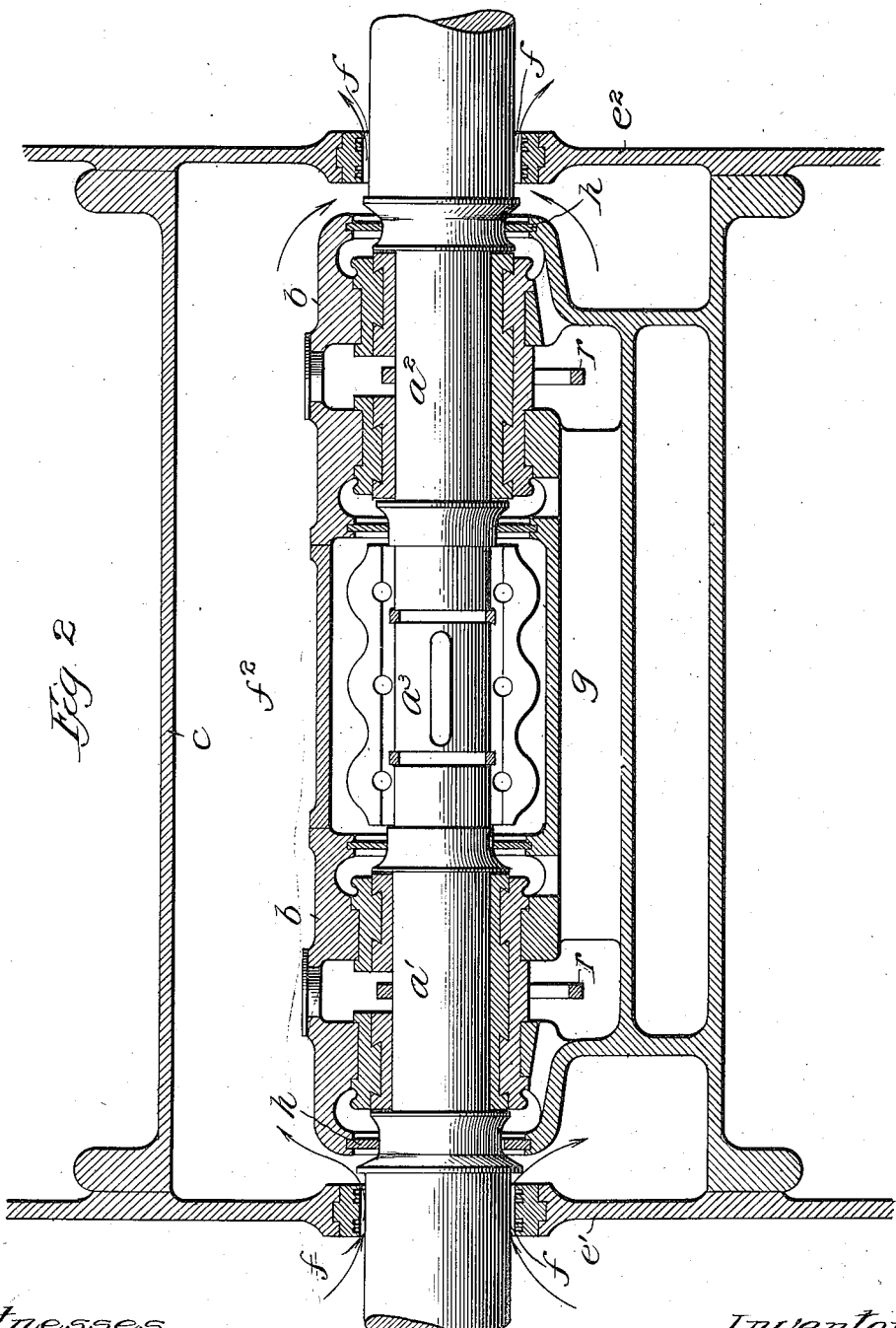

UNITED STATES PATENT OFFICE.

AUGUSTE CAMILLE EDMOND RATEAU, OF PARIS, FRANCE.

SHAFT-BEARING.

1,125,172.  Specification of Letters Patent.  Patented Jan. 19, 1915.

Application filed December 7, 1906. Serial No. 346,725.

*To all whom it may concern:*

Be it known that I, AUGUSTE CAMILLE EDMOND RATEAU, citizen of the Republic of France, residing at Paris, France, have invented a certain new and useful Improvement in Shaft-Bearings, of which the following is a full, clear, concise, and exact description..

This invention relates to shaft bearings, and its object is to provide improved means for preventing the passage of air or gas between a shaft and a bearing therefor, which is interposed between two machine casings into which the shaft extends, and in which different pressures may exist. The passage of air or gas between the shaft and bearing, which it is the object of the present invention to prevent, causes an entrainment by the air or gas of the oil supplied to the bearing for lubricating purposes. This entrainment not only tends to leave the bearing dry, but causes the oil to be blown into other apparatus where its presence may be objectionable.

In accordance with the present invention, the bearing proper is inclosed within an external housing, which is provided with a channel communicating with both ends of the bearing, affording a bypass for air or gas about the bearing from one machine casing to the other. This bypass practically equalizes the pressures at the opposite ends of the bearing; and for the flow of air and gas resulting from such slight difference in pressure as may result, the bypass will offer such a low resistance in comparison with the resistance to the flow between the shaft and bearing, that the oil will not be forced longitudinally along the shaft of the bearing to an appreciable extent. I also provide an oil retaining means, such as a packing ring, at the ends of the bearing.

My invention will be applicable to centrifugal compressors and similar fluid pressure apparatus.

My invention will be described more particularly by reference to the accompanying drawings, in which:

Figure 1 is a transverse sectional view of the intermediate bearing shown in Fig. 2, half of the section being taken on a plane through one of the wells in which the lubricating rings ride, and the other half of the section being taken on a plane midway between two such wells; and Fig. 2 is a longitudinal sectional view of the bearing shown in Fig. 1.

In the drawings, I have illustrated the application of my invention to an intermediate bearing, located on a portion of a shaft which extends between two machine casings, whose walls are shown at $e'$ and $e^2$. I provide a supplementary passage or by-pass $f^2$ in the housing $c$, extending from one wall to the other, the housing being air-tight, so that this bypass has no communication with the exterior. The shaft is shown as made in two sections $a'$, $a^2$, coupled at $a^3$. Any air which goes from one side to the other through the passages $f$ in the walls $e'$, $e^2$, finds a passage through the bypass $f^2$ of very slight resistance, so that it takes the bypass, instead of forcing its way between the shaft and the bearing, as would otherwise be the case. The oil, therefore, which is supplied to the bearings by the rings $r$ dipping in the reservoir $g$, is not entrained by the air and the latter cannot escape from the housing. In the drawings, two intermediate bearings proper are shown, surrounded by an annular housing $c$, extending from wall $e'$ to wall $e^2$ and the entire upper portion of the space between the bearing and the housing constitutes the bypass. The lower portion of this space is shown as inclosed to form a reservoir for water to cool the bearings when excessive speeds are employed.

It will be understood that any desired means of conducting oil to the bearings may be adopted.

Preferably washers or bushings $h$, $h$ are provided at the ends of the journals, encircling the shaft as closely as may be, to give additional protection against passage of air to or from the bearings.

Having now described my invention, what I claim as new and desire to secure by Letters Patent, is:

1. The combination with two machine casings, of a shaft extending through both casings, an intermediate bearing for said shaft, a fluid-tight housing extending between said casings and inclosing said bearing, the inside of said housing forming a by-pass for fluid from one casing to the other in shunt of said bearing.

2. The combination with two machine casings, of a shaft extending through both casings, an intermediate bearing for said shaft, an air-tight housing extending between said casings and inclosing said bearing, the inside of said housing forming a bypass for fluid from one casing to the other in shunt of said bearing, and packings for the shaft at the ends of the bearing.

3. The combination with two machine casings and a shaft for the machine, of a bearing for said shaft, an air-tight housing for said bearing having an air channel or bypass communicating with the shaft at both ends of the bearing, and washers at the ends of the bearing between the bearing surface and the point of communication of said air channel with the shaft.

In witness whereof, I hereunto subscribe my name this 23rd day of November, A. D., 1906.

AUGUSTE CAMILLE EDMOND RATEAU.

Witnesses:
R. J. A. CHALEIL,
H. C. COXE.